Patented Nov. 16, 1926.

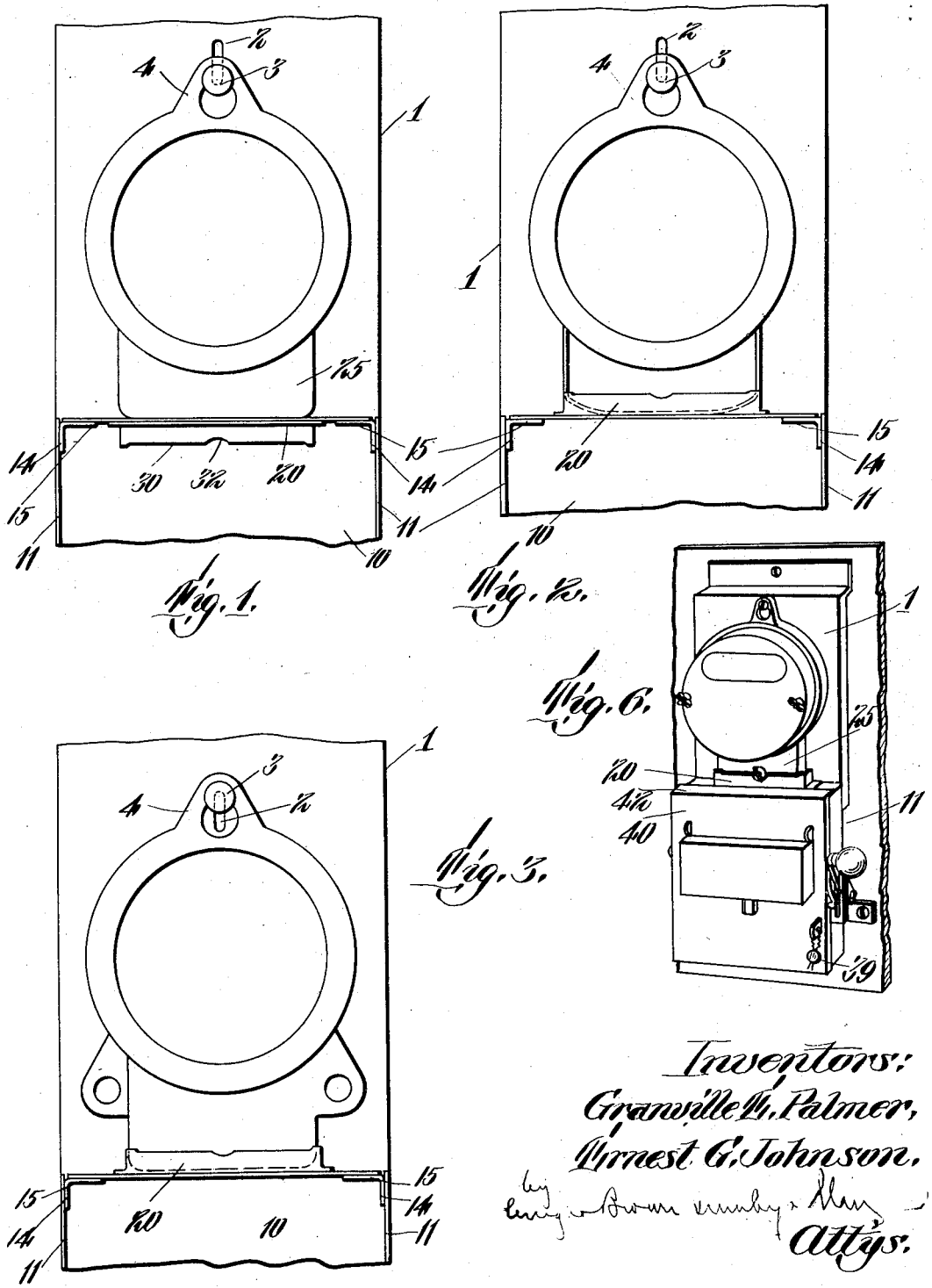

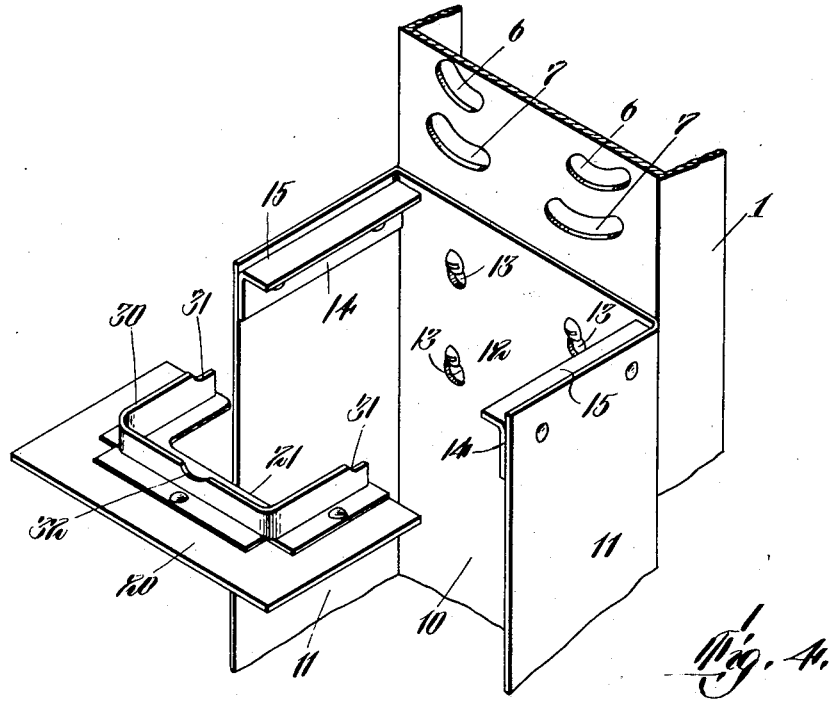
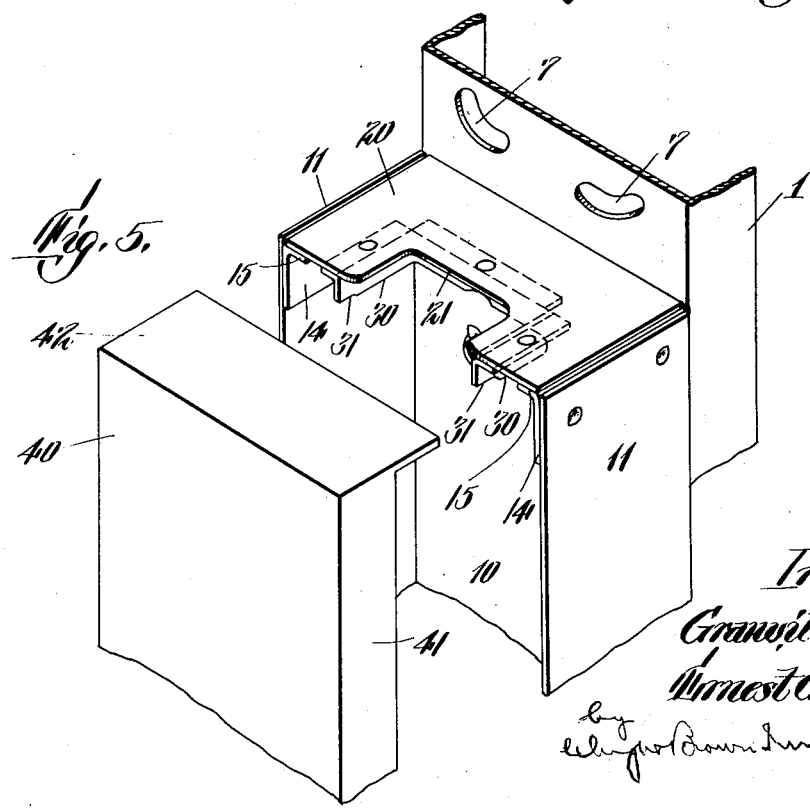

1,606,893

UNITED STATES PATENT OFFICE.

GRANVILLE E. PALMER, OF BROOKLINE, AND ERNEST G. JOHNSON, OF BOSTON, MASSACHUSETTS, ASSIGNORS TO THE PALMER ELECTRIC AND MANUFACTURING COMPANY, OF CAMBRIDGE, MASSACHUSETTS, A CORPORATION OF MAINE.

METER INSTALLATION.

Application filed September 15, 1923. Serial No. 662,837.

This invention relates to meter installations of that type wherein the protection fuses and related mechanism are mounted within a casing having such connection with the meter that unauthorized access to live terminals, particularly on the service side of the meter, is prevented. More particularly it relates to the construction whereby a close fitting registry between the casing and any of a plurality of meters having terminal chambers of various shapes and sizes may be effected by merely rearranging this certain part, whereby meters are readily interchangeable without the requirement of special adapter plates for each type.

According to this invention an adapter plate is formed on one side with a socket portion, the aperture in the plate being of a smaller size than the socket to cooperate by turning one or the other side out with various types of meters and the meter-supporting board is formed to support the upper end of the meters at different heights so that the adapter plate may be engaged with the casing in the same position with all the meters the outlet of the meter terminal chamber being positioned at the desired location relative to the adapter plate in each case. This plate may also be so assembled with relation to the casing as to complete its closing when no meter is present.

As heretofore commonly constructed eleven different adapter plates have been required to fit various types of meters in common use and one closure plate when no meter was present. The one plate of this invention may fully take the place of all of these twelve plates.

For a more complete understanding of this invention reference may be had to the accompanying drawings in which—

Figures 1, 2 and 3 are somewhat diagrammatic fragmentary elevations showing three types of meters supported on the meter board and the adapted plate closing off an opening in the casing and fitting about the terminal portions of the respective meters.

Figures 4 and 5 are fragmentary isometric views, Figure 4 showing the adapter plate disassociated from the casing and one side up showing one of its socket portions presented upwardly, and Figure 5 shows the adapter plate associated with the casing the other side up and in such position that when the casing cover is assembled therewith the casing is entirely closed.

Figure 6 represents a meter attached to a vertical wall or panel, and embodying the invention.

Referring to these figures, at 1 is indicated a meter board, designed to be attached to a vertical wall or panel in the usual manner as shown in Figure 6, having a vertical slot 2 therein in which may be fixed with capability of vertical adjustment a supporting pin or stud 3 over which the usual loop 4 at the upper end of the meter may be hung. Spaced from this slot at a suitable distance are arcuate slots 6 and 7 formed about different adjusted portions of the stud 3 as centers and through which may be placed fastener means such as bolts which extend from or register with holes in the meter and by which the lower ends of the meter may be clamped firmly in position, this construction permitting the meter to be swung about the pin 3 as an axis so that it may be accurately leveled regardless of ordinary inaccuracy in the setting of the meter board. At 10 is shown the upper end of a casing having side walls 11, and a rear wall 12 which may be made fast to the meter board as by screw and slot connections as at 13. Adjacent the upper ends of the sides 11 are inwardly extending angle members 14 each having a horizontal flange 15 on which may rest the adapter plate 20. This adapter plate is cut away on one side as at 21 forming an opening having a contour adapted to fit the terminal portions of one or more types of meters which may be supported on the meter board.

On the other side of the adapter plate is positioned a flange member 30, which as shown clearly in Figures 4 and 5, is larger than the opening 21 so that it is spaced from the margin of this opening. This flange, which may be formed of an angle bar having one leg fixed to the surface of the adapter plate is cut away as shown at 31 and 32 to adapt it to receive either of the meter terminal portions of the meters shown in Figures 2 and 3, the flange extending outwardly from the casing. Where the meter shown in Figure 2 is employed it is hung from the pin 3 placed in the lower portion of the slot 2, but when the meter shown in Figure 3 is used, it is hung from the pin engaged in the upper portion of the slot. It will thus be seen that the marginal edge of the plate about the cut away portion and the flange 30 form margins for the cutout of different contours on opposite sides of the adapter plate, one of these margins conforming to one or more types of meters when presented in facing relation thereto, and the other conforming to one or more other types when the plate is in reversed position to present that margin in facing relation thereto. When the meter adapter is placed in position on the flange 15 with the cut out portion 21 adjacent the meter board and the flange 30 extending inwardly, one or more of the meters may cooperate therewith in the manner shown in Figure 1. The particular meter there shown is hung on the pin 3 from the lower portion of the slot 2 and its lower terminal portion 25 closely engages the marginal edge of the adapter plate opening. It will be noted that the adapter plate is of slightly less length than the distance between the walls 11 of the casing. This permits the meters to be adjusted to vertical position while retaining proper engagement with the adapter plate, the adapter plate being permitted to move laterally to some extent with the meter as it is being swung to the adjusted position.

The forward face of the casing may be closed by a cover 40, which may be sealed closed as by a seal 39 (Figure 6). This cover has side flanges 41, one of which is shown in Figure 5, adapted to overlap the sides 11, and a flange 42 extending from the upper end of the cover and overlying the outer edge of the adapter plate and retaining it in position on the angle members 14. When the adapter plate is positioned endwise so that the opening 21 of the adapter plate is turned away from the meter board, as shown in Figure 5, the flange 42 overlies the entire opening and effectively closes off the interior of the casing from unauthorized access. When the plate is reversed end for end, the opening 21 being turned so as to face the meter board, this flange 42 does not extend thereover so that it does not interfere with the proper placing of the meter, the plate being positioned with that side outwardly directed which conforms to the meter which it is desired to use.

With this construction it is possible to use a single adapter plate for several well known makes of meters of different lengths and having different shapes of terminal chambers, or to close off the casing entirely without the use of additional members. However used, the adapter plate always engages the casing at the same position.

Having thus described an embodiment of this invention it should be evident that various modifications and changes may be made therein without departing from its spirit or scope as defined by the appended claims.

We claim:

1. A meter adapter element consisting of a box closure plate including means in connection with opposite faces thereof for forming a close fitting registry with the terminal chambers of different types of meters for the preventing of unauthorized access to terminals to be protected.

2. A meter adapter plate having an opening therethrough, and a flange partially surrounding said opening, spaced from the margin thereof on one face of said plate, the edge of said opening and said flange presenting margins of different contours conforming to meter terminal chambers of various shapes and sizes.

3. A meter adapter comprising a box closure plate having a cutout portion extending inwardly from one edge and a flange extending laterally about the cutout portion on one side of said plate and spaced from the margin of said portion, said cutout portion being shaped to register with a meter terminal chamber of one shape the flange extending away therefrom, and said flange being shaped to register with the terminal chamber of another shape when extended theretoward.

4. A meter adapter comprising a box closure having an opening therethrough, said opening having margins of different contour on opposite sides of said plate, said margins being shaped to register with differently shaped meter terminal chambers when turned to face said chambers.

5. A device of the class described comprising a meter board, means for supporting a meter at any of a plurality of positions on said board whereby the outlet of the terminal chamber of a meter of any of a plurality of shapes and sizes may be positioned at a desired location, a meter casing carried by said board, and an adapter plate for said casing having an opening therethrough, said opening having margins of different contours on opposite faces of said plate each shaped to operatively register with meter terminal chambers of one or more shapes and sizes, said device comprising means for supporting said plate in one plane on said casing either side out to present the proper margin for registration with the terminal chamber of the particular meter supported by said board.

6. A device of the class described comprising a meter board, means for supporting a meter at any of a plurality of positions on said board whereby the outlet of the terminal chamber of a meter of any of a plurality of shapes and sizes may be positioned at a desired location, a meter casing carried by said board and having an open wall portion, an adapter plate for said casing having an opening therethrough, said opening having margins of different contours on opposite faces of said plate shaped to operatively register with terminal chambers of various shapes and sizes, said device comprising means for supporting said plate selectively on said casing to present the proper margin for registration with the terminal chamber of the particular meter supported by said board and when no meter is present to close off the open wall portion of said casing.

7. A device of the class described comprising a meter board, means for supporting a meter at any of a plurality of positions on said board, whereby the outlet of the terminal chamber of a meter of any of a plurality of shapes and sizes may be positioned at a desired location, a meter casing carried by said board, and an adapter plate having a plurality of portions each formed to register with various shaped meter terminal chambers, said device including means for supporting said adapter plate on said casing with any of said portions properly positioned to cooperate with a meter terminal with which it may properly register when said meter terminal is positioned at said location.

8. In combination, a casing, a meter board for supporting a meter and said casing in registry with said meter, a stud on which a meter may be hung, and means for vertically adjusting said stud on said board, said board having a plurality of sets of arcuate slots described about said stud as a center in a plurality of different positions to receive fastenings for other portions of said meters, one wall of said casing comprising an adapter plate having portions registrable with various shaped meter terminal chambers, the adjustability of meters on said board permitting the proper positioning of their terminal chambers relative to said plate.

9. A device of the class described comprising a meter protective casing having an open portion, and a meter adapter plate formed on opposite sides to register with meter terminal housings of different shapes and sizes, said device comprising means for positioning said plate selectively relative to said casing to entirely close said portion or either side out to partially close said open portion.

10. A device of the class described comprising a meter protective casing having an open portion, a meter adapter plate having an opening and formed on opposite sides to register with meter terminal housings of different shapes and sizes, said device comprising means adapting said plate to be arranged in one endwise position relative to said casing either side out in position to cooperate with a meter terminal housing with which the outwardly presented side is formed to register to prevent unauthorized access to conductors within said casing, said means also adapting said plate to be arranged in a position reversed end for end to said first mentioned position and wherein said plate closes off said open portion when no meter is present.

11. A device of the class described comprising a meter protective casing and an adapter plate, said device having means for supporting said plate on said casing either side out to bridge an opening in said casing, said plate having an opening therethrough and presenting marginal portions about said opening of different contours on opposite sides of said plate and with each of which meter terminal portions of one or more shapes and sizes may register.

12. A device of the class described comprising a casing having an open side portion, a meter adapter bridging said open side portion and having an opening therethrough, an extension about said opening on one face of said adapter shaped to cooperate with meter terminal chambers of various shapes and sizes to prevent access to the interior of said casing between said adapter and terminal chamber, and means adjustable to the size and style of meter for supporting said meter with its terminal chamber in cooperative relation to said adapter.

In testimony whereof we have affixed our signatures.

GRANVILLE E. PALMER.
ERNEST G. JOHNSON.